(12) United States Patent
Anchi et al.

(10) Patent No.: US 11,449,440 B2
(45) Date of Patent: Sep. 20, 2022

(54) DATA COPY OFFLOAD COMMAND SUPPORT ACROSS MULTIPLE STORAGE ACCESS PROTOCOLS

(71) Applicant: EMC IP Holding Company LLC, Hopkinton, MA (US)

(72) Inventors: Amit Pundalik Anchi, Bangalore (IN); Rimpesh Patel, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/151,784

(22) Filed: Jan. 19, 2021

(65) Prior Publication Data
US 2022/0229785 A1 Jul. 21, 2022

(51) Int. Cl.
*G06F 13/38* (2006.01)
*G06F 13/16* (2006.01)
*G06F 13/362* (2006.01)

(52) U.S. Cl.
CPC ........ *G06F 13/1668* (2013.01); *G06F 13/362* (2013.01); *G06F 2213/0008* (2013.01); *G06F 2213/0036* (2013.01)

(58) Field of Classification Search
CPC .............. G06F 13/1668; G06F 13/362; G06F 2213/0008; G06F 2213/0036
See application file for complete search history.

(56) References Cited

U.S. PATENT DOCUMENTS

| 6,567,397 B1 | 5/2003 | Campana et al. |
| 6,687,746 B1 | 2/2004 | Shuster et al. |
| 6,697,875 B1 | 2/2004 | Wilson |

(Continued)

FOREIGN PATENT DOCUMENTS

| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Cheng Yuan Tseng
(74) *Attorney, Agent, or Firm* — Ryan, Mason & Lewis, LLP

(57) ABSTRACT

An apparatus includes at least one processing device, with the at least one processing device comprising a processor and a memory coupled to the processor. The at least one processing device is configured to generate a data copy offload command to offload a data copy operation from a host device to a storage system, the command comprising a multi-protocol indicator that specifies that data is to be copied from a source logical storage device that utilizes a first access protocol to a destination logical storage device that utilizes a second access protocol different than the first access protocol, and to send the data copy offload command from the host device to the storage system over a network for performance of the offloaded data copy operation in the storage system in accordance with the command. The first and second access protocols illustratively comprise respective SCSI and NVMe access protocols.

20 Claims, 4 Drawing Sheets

400

| COMMAND CODE | MULTI-PROTOCOL INDICATOR | CSCD DESCRIPTORS | SEGMENT DESCRIPTORS | OTHER PARAMETERS |

DATA COPY OFFLOAD COMMAND

(56) References Cited

U.S. PATENT DOCUMENTS

| | | | |
|---|---|---|---|
| 7,275,103 B1 | 9/2007 | Thrasher et al. | |
| 7,454,437 B1 | 11/2008 | Lavallee et al. | |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,534,738 B2 * | 1/2020 | Ranjan | G06F 13/4027 |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,817,181 B2 | 10/2020 | Mallick et al. | |
| 10,838,648 B2 | 11/2020 | Sharma et al. | |
| 10,880,217 B2 | 12/2020 | Mallick et al. | |
| 10,884,935 B1 | 1/2021 | Doddaiah | |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0201458 A1 | 8/2008 | Salil | |
| 2008/0301332 A1 | 12/2008 | Butler et al. | |
| 2009/0259749 A1 | 10/2009 | Barrett et al. | |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0021653 A1 | 1/2020 | Rao et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1 | 7/2020 | Mallick et al. | |
| 2020/0314218 A1 * | 10/2020 | Kumar | H04L 69/08 |
| 2020/0348860 A1 | 11/2020 | Mallick et al. | |
| 2020/0348861 A1 | 11/2020 | Marappan et al. | |
| 2020/0348869 A1 | 11/2020 | Gokam | |
| 2020/0349094 A1 | 11/2020 | Smith et al. | |
| 2020/0363985 A1 | 11/2020 | Gokam et al. | |
| 2020/0372401 A1 | 11/2020 | Mallick et al. | |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "DELL EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 16/697,393 filed in the name of Vinay G. Rao et al., filed Nov. 27, 2019, and entitled "Automated Seamless Migration of Logical Storage Devices."

U.S. Appl. No. 16/710,828 filed in the name of Amit Pundalik Anchi et al., filed Dec. 11, 2019, and entitled "Automated Seamless Migration with Signature Issue Resolution."

U.S. Appl. No. 16/599,235 filed in the name of Sanjib Mallick et al., filed Oct. 11, 2019, and entitled "Host Device with Multi-Path Layer Providing Dynamic Control of One or More Path Selection Algorithms."

U.S. Appl. No. 17/106,788 filed in the name of Amit Pundalik Anchi et al., filed Nov. 30, 2020, and entitled "Automated Seamless Migration Across Access Protocols for a Logical Storage Device."

U.S. Appl. No. 16/797,671 filed in the name of Vinay G. Rao et al., filed Feb. 21, 2020, and entitled "Host Device with Efficient Automated Seamless Migration of Logical Storage Devices Across Multiple Access Protocols."

U.S. Appl. No. 16/793,262 filed in the name of Amit Pundalik Anchi et al., filed Feb. 18, 2020, and entitled "Non-Disruptive Transformation of a Logical Storage Device from a First Access Protocol to a Second Access Protocol."

(56) References Cited

OTHER PUBLICATIONS

U.S. Appl. No. 17/113,184 filed in the name of Amit Pundalik Anchi et al., filed Dec. 7, 2020, and entitled "Performance-Driven Access Protocol Switching for a Logical Storage Device."

* cited by examiner

DATA COPY OFFLOAD COMMAND SUPPORT ACROSS MULTIPLE STORAGE ACCESS PROTOCOLS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (TO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols. Copying of data from one logical storage device to another can be problematic, particularly when the logical storage devices utilize different access protocols. For example, if such data copying is done primarily by the host device, such copying consumes excessive resources of the host device, and as a result can adversely impact system performance. Moreover, offloading the data copying from the host device to the storage system can also be difficult when the logical storage devices utilize different access protocols. A need therefore exists for improved techniques that can avoid these and other drawbacks of conventional approaches.

SUMMARY

Illustrative embodiments provide data copy offload command support across multiple storage access protocols for logical storage devices of a storage array or other type of storage system. The data copy offload commands in some embodiments are also referred to herein as "multi-protocol data copy offload commands."

For example, one or more embodiments can allow a data copy offload command to be executed by a storage system to copy a source logical storage device to a destination logical storage device even when the source and destination logical storage devices utilize different storage access protocols, such as respective SCSI and NVMe access protocols. The SCSI and NVMe access protocols of the source and destination logical devices may more particularly comprise SCSI over Fibre Channel (SCSI-FC) and NVMe over Fabrics (NVMeF) access protocols, although it is to be appreciated that a wide variety of other types of storage access protocols can be used in other embodiments.

Such embodiments advantageously avoid the need for the host device to consume its resources in performing a data copy operation, by facilitating the offload of the data copy operation to the storage system. This overcomes difficulties of conventional arrangements, including limitations on conventional SCSI extended copy ("XCOPY") commands which generally prevent such commands from being used by a host device to direct a storage system to copy a source logical storage device to a destination logical storage device, where the source and destination logical storage devices utilize different storage access protocols. As indicated previously, even though a storage system may support multiple access protocols like SCSI and NVMe for its logical storage devices, attempting to use a conventional data copy offload command such as the SCSI XCOPY command to direct a storage system to copy a SCSI logical storage device to an NVMe logical storage device is problematic.

Illustrative embodiments disclosed herein facilitate offloaded storage-side copying of logical storage devices in storage systems that support multiple protocols, so as to reduce consumption of host device resources that might otherwise be required to perform the data copy, thereby improving overall system performance.

In one embodiment, an apparatus comprises at least one processing device comprising a processor and a memory coupled to the processor. The at least one processing device is configured to generate a data copy offload command to offload a data copy operation from a host device to a storage system. The command comprises a multi-protocol indicator that specifies that data is to be copied from a source logical storage device that utilizes a first access protocol to a destination logical storage device that utilizes a second access protocol different than the first access protocol. The at least one processing device sends the data copy offload command from the host device to the storage system over a network for performance of the offloaded data copy operation in the storage system in accordance with the command.

The at least one processing device illustratively comprises at least a portion of the host device, although other arrangements are possible.

The data copy offload command is illustratively sent over a selected path to the source logical storage device utilizing the first access protocol, the path being associated with a particular initiator-target pair, where the initiator of the initiator-target pair comprises a corresponding host bus adaptor (HBA) of the host device and the target of the initiator-target pair comprises a corresponding port of the storage system.

The host device in some embodiments illustratively comprises a multi-path layer, with the multi-path layer comprising at least one multi-path input-output (MPIO) driver configured to control delivery of IO operations from the host device to the storage system over selected paths through the network.

In some embodiments, the data copy offload command comprises an extended copy command that includes, in addition to the multi-protocol indicator, copy-source and copy-destination (CSCD) descriptors identifying the respective source and destination logical storage devices, and one or more segment descriptors each identifying particular data to be copied from the source logical storage device to the destination logical storage device in accordance with the data copy offload command.

The data copy offload command in some embodiments comprises a modified version of an extended copy command in one of the first and second access protocols.

As another example, the data copy offload command in other embodiments comprises a vendor unique command in one of the first and second access protocols.

The at least one processing device is further configured in some embodiments to generate an inquiry command and to send the inquiry command to the storage system in order to determine whether or not the storage system supports multi-protocol data copy offload commands. The storage system therefore reports back to the host device, in response to the inquiry command, information indicating whether or not the not the storage system supports multi-protocol data copy offload commands.

In some embodiments, the multi-protocol indicator of the data copy offload command takes on a first value to specify that the data copy offload command is a multi-protocol data copy offload command and takes on a second value different than the first value to specify that the data copy offload command is a single-protocol data copy offload command. The multi-protocol indicator illustratively comprises a single bit, although other types of indicators can be used in other embodiments.

In some embodiments, the storage system is configured to perform one or more copy functions specified by one or more segment descriptors of the data copy offload command. For example, the copy functions may be performed by cooperative interaction of a first copy manager associated with the first access protocol and a second copy manager associated with the second access protocol. A single copy manager may be used in other embodiments.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
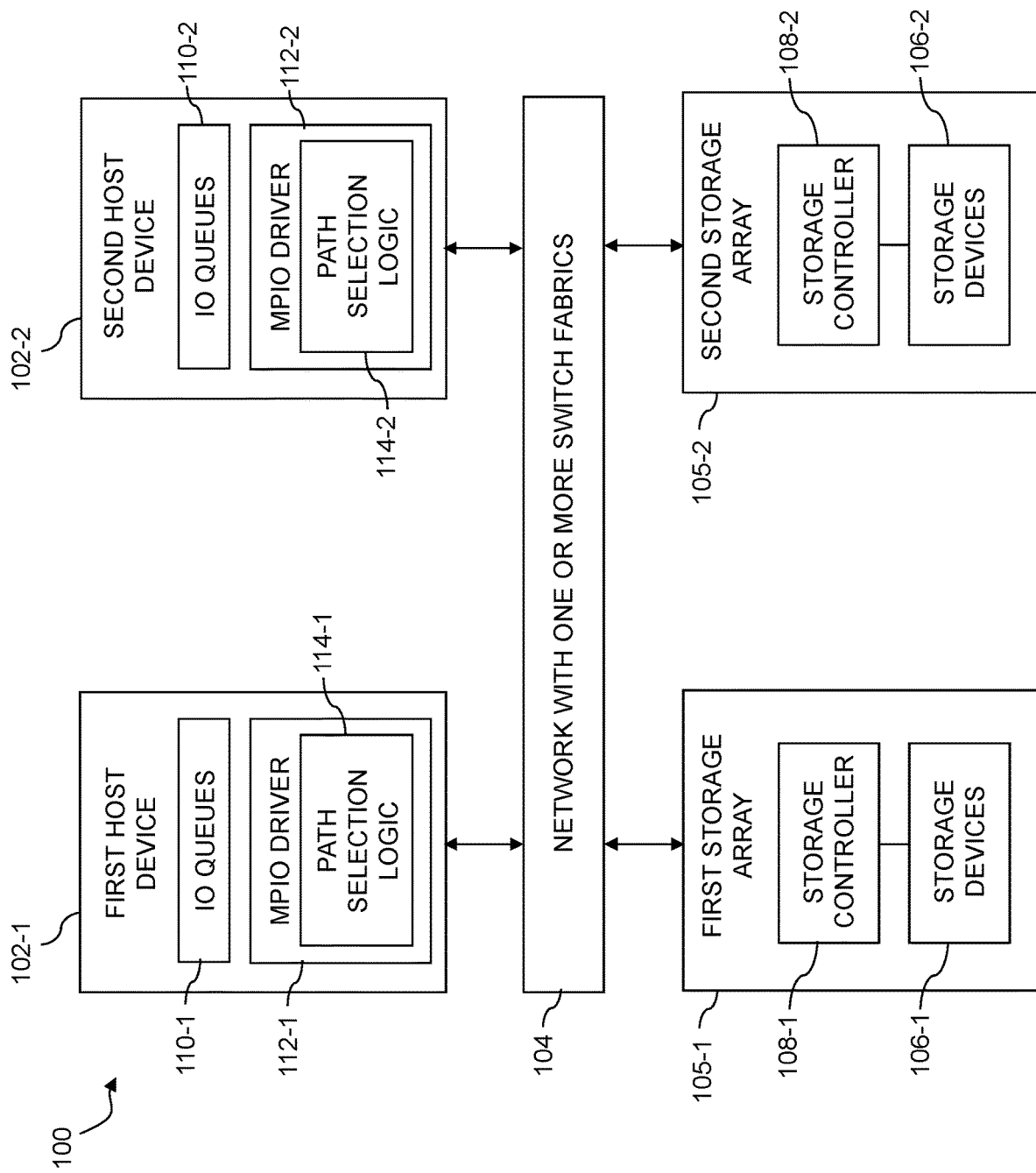
FIG. 1 is a block diagram of an information processing system configured with functionality for multi-protocol data copy offload command support utilizing a multi-path layer of a host device in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, collectively referred to herein as storage arrays 105. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more Unity™ or PowerMax™ storage arrays, commercially available from Dell Technologies. As another example, one or both of the storage arrays 105 may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by one of the host devices 102 to one of the storage arrays 105 is considered an "outstanding" command until such time as its execution is completed in the viewpoint of the sending host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

As a more particular example, the host devices 102 in some embodiments illustratively comprise an ESXi environment or other type of host environment that supports non-disruptive movement of applications between ESXi servers or other types of servers, possibly using vMotion or other similar techniques to move VMs, in which those application execute, from one server to another server.

Accordingly, in some embodiments, the host devices 102 are configured to support such application movement between those host devices. This application movement can be used as part of an automated seamless migration of a logical storage device between access protocols, although other types of automated seamless migration not involving application movement can be used in other embodiments.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabrics, also referred to as NVMeF, and NVMe over Transmission Control Protocol (TCP), also referred to as NVMe/TCP.

The storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The storage arrays 105-1 and 105-2 may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic controls performance of the above-noted replication process. The snapshot generator can be used, for example, to generate snapshots of one or more storage volumes that are subject to synchronous replication in conjunction with active-active storage clustering, and in a wide variety of different migration scenarios.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume implemented on one or both of the storage arrays 105 in the system 100 illustratively comprises a set of one or more LUNs or other storage volumes of one or both of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

In some embodiments, the multi-path layer additionally supports what is referred to herein as "multi-protocol data copy offload command support" for logical storage devices of the storage arrays 105. Such multi-protocol data copy offload command support functionality in some embodiments is illustratively implemented at least in part in the multi-path layer, and may additionally or alternatively be implemented at least in part in respective data copy offload logic instances of the host devices 102.

The MPIO drivers 112 may comprise, for example, otherwise conventional MPIO drivers, such as PowerPath® drivers from Dell Technologies, suitably modified in the manner disclosed herein to provide multi-protocol data copy offload command support. Other types of MPIO drivers from other driver vendors may be suitably modified to incorporate functionality for multi-protocol data copy offload command support as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

As also noted above, the MPIO driver 112-1 in some embodiments is also configured to implement at least portions of multi-protocol data copy offload command support functionality of host device 102-1. Other host device components, such as data copy offload logic implemented in one or more host device processors, can additionally or alternatively implement aspects of the multi-protocol data copy offload command support functionality of the host device 102-1. The disclosed embodiments are therefore not limited to embodiments in which multi-protocol data copy offload command support functionality is controlled at least in part by an MPIO driver or multi-path layer.

As indicated previously, a given host device is generally unable to use a conventional data copy offload command, such as a SCSI XCOPY command, to direct a storage array or other type of storage system to copy a source logical storage device to a destination logical storage device, where the source and destination logical storage devices utilize different storage access protocols. Accordingly, even though a storage system may support multiple access protocols like SCSI and NVMe for its logical storage devices, attempting to use a conventional data copy offload command to direct a storage system to copy a SCSI logical storage device to an NVMe logical storage device can be problematic. This generally means that, absent use of the techniques disclosed herein, the host device in such situations must consume its own resources to perform the desired data copy operation, rather than offload it to the storage system.

Illustrative embodiments disclosed herein overcome these and other drawbacks of conventional approaches, by providing data copy offload command support across multiple storage access protocols for logical storage devices of a storage array or other type of storage system.

For example, one or more embodiments can allow a data copy offload command to be executed by a storage system to copy a source logical storage device to a destination logical storage device even when the source and destination logical storage devices utilize different storage access protocols, such as respective SCSI and NVMe access protocols, or more particularly SCSI-FC and NVMeF access protocols. Such arrangements advantageously facilitate copying of logical storage devices across multiple access protocols and therefore provide improved overall system performance.

Data copy offload commands such as SCSI XCOPY commands are extensively used in VMware environments in operations such as VM cloning, VM migration using vMotion, and VM creation from templates (e.g., bulk copying to create many similar VMs at one time). Such a data copy offload command illustratively directs the storage array to perform a data copy from a source logical device to a destination logical device. This relieves the host from performing the data copy and avoids associated consumption of critical host resources such as CPU cycles, RDMA buffers and HBA queues. These and other similar conventional data copy offload commands are generally utilized when both the source and destination devices are part of the same storage system. The XCOPY command is a SCSI protocol command, and there is currently no equivalent NVMe protocol command.

Storage systems such as the above-noted PowerMax™ storage array generally support multiple access protocols in a single storage system (e.g., SCSI-FC, iSCSI, NVMeF, etc.) that allows the host to be provisioned with both SCSI and NVMe devices from single storage system as needed.

Consider by way of example a VMware ESXi host having access to both SCSI and NVMe devices from a single storage system. It is generally not possible to utilize conventional SCSI XCOPY commands to clone or migrate virtual machines currently deployed on SCSI storage to NVMe storage. This limitation of conventional SCSI XCOPY commands is due to lack of multi-protocol support in the SCSI XCOPY commands and non-availability of any other multi-protocol supported data copy offload commands.

Illustrative embodiments herein provide support for multi-protocol XCOPY commands or other types of multi-protocol data copy offload commands. Such commands are suitable for use, for example, in situations in which source and destination logical storage devices are associated with different access protocols (e.g., SCSI-FC, iSCSI, NVMeF, etc.) and can be executed by the storage system to perform data copy across the two distinct access protocols of the source and destination logical storage devices.

As part of the multi-protocol data copy offload command support functionality of illustrative embodiments, at least one of the host devices 102, assumed by way of example to be the first host device 102-1, is configured to generate a data copy offload command to offload a data copy operation from the host device 102-1 to one of the storage arrays 105, assumed by way of example to be the first storage array 105-1. The command illustratively comprises a multi-protocol indicator that specifies that data is to be copied from a source logical storage device that utilizes a first access protocol to a destination logical storage device that utilizes a second access protocol different than the first access protocol. The host device 102-1 sends the data copy offload command to the storage array 105-1 over the network 104 for performance of the offloaded data copy operation in the storage system in accordance with the command. Similar multi-protocol data copy offload command support functionality can be performed by the first host device 102-1 relative to the second storage array 105-2, and by the second host device 102-2 relative to either the first storage array 105-1 or the second storage array 105-2.

As indicated previously, the first and second access protocols illustratively comprise respective SCSI and NVMe access protocols, such as SCSI-FC and NVMeF access protocols, although other arrangements of two or more distinct access protocols can be used in other embodiments.

The host device 102-1 or portions thereof may be viewed as an example of what is more generally referred to herein as "at least one processing device" comprising a processor coupled to a memory. Other arrangements of one or more processing devices, each comprising at least one processor and at least one memory coupled to the at least one processor, may be used in other embodiments.

The MPIO driver 112-1 is configured to control delivery of IO operations from the host device 102-1 to the storage array 105-1 over selected paths through the network 104, using its path selection logic 114-1.

The data copy offload command is illustratively sent by the MPIO driver 112-1 over a selected path to the source logical storage device utilizing the first access protocol. The selected path over which the data copy offload command is sent from the host device 102-1 to the storage array 105-1 is assumed to be associated with a particular initiator-target pair. The initiator of the initiator-target pair illustratively comprises a corresponding HBA of the host device 102-1 and the target of the initiator-target pair illustratively comprises a corresponding port of the storage array 105-1, although other types of paths and associated initiators and targets may be used in other embodiments.

In some embodiments, the data copy offload command generated by the host device 102-1 comprises an extended copy command that includes, in addition to the multi-protocol indicator, copy-source and copy-destination (CSCD) descriptors identifying the respective source and destination logical storage devices and one or more segment descriptors each identifying particular data to be copied from the source logical storage device to the destination logical storage device in accordance with the data copy offload command.

The data copy offload command in some embodiments comprises a modified version of an extended copy command in one of the first and second access protocols, such as, for example, a modified version of a SCSI XCOPY command.

As another example, the data copy offload command in other embodiments comprises a vendor unique or VU command in one of the first and second access protocols, such as, for example, a VU SCSI command.

The host device 102-1 is further configured in some embodiments to generate an inquiry command and to send the inquiry command to the storage array 105-1 in order to determine whether or not the storage array 105-1 supports multi-protocol data copy offload commands, prior to generating and sending a multi-protocol data copy offload command to the storage array 105-1. The storage array 105-1 therefore reports back to the host device 102-1, in response to the inquiry command, information indicating whether or not the not the storage array 105-1 supports multi-protocol data copy offload commands.

In some embodiments, the multi-protocol indicator of the data copy offload command generated by the host device 102-1 takes on a first value to specify that the data copy offload command is a multi-protocol data copy offload command and takes on a second value different than the first value to specify that the data copy offload command is a single-protocol data copy offload command. The multi-protocol indicator illustratively comprises a single bit, although other types of indicators can be used in other embodiments.

In some embodiments, the storage array 105-1 is configured to perform one or more copy functions specified by one or more segment descriptors of the data copy offload command. For example, the copy functions may be performed by cooperative interaction of a first copy manager associated with the first access protocol and a second copy manager associated with the second access protocol. A single copy manager may be used in other embodiments. Accordingly, one or more copy managers of the storage array 105-1 are illustratively configured to execute the data copy offload command received from the host device 102-1 in order to copy data from the source logical storage device to the destination logical storage device in accordance with the various parameters and other information in the command. Such execution in some embodiments utilizes one or more copy functions similar to those utilized in an otherwise conventional extended copy command, such as a SCSI XCOPY command.

The above-described functions associated with multi-protocol data copy offload command support functionality of the host device 102-1 are illustratively carried out at least in part utilizing the MPIO driver 112-1 and its path selection logic 114-1. Additional or alternative host device components, such as data copy offload logic implemented in the host device 102-1, can be used to control performance of a multi-protocol data copy offload command support process such as that of FIG. 2.

It is assumed without limitation that the second host device 102-2 is configured to operate in a manner similar to that described above and elsewhere herein for the first host device 102-1. The MPIO driver 112-2 is therefore similarly configured to select IO operations from its corresponding one of the sets of IO queues 110 for delivery to the storage arrays 105 over the network 104 and to perform at least portions of the disclosed multi-protocol data copy offload command support functionality. Also, aspects of multi-protocol data copy offload command support functionality described above in the context of the first host device 102-1 are assumed to be similarly performed by the other host device 102-2.

The second storage array 105-2 is similarly assumed to be configured to operate in a manner similar to that described above and elsewhere herein for first storage array 105-1 with respect to its multi-protocol data copy offload command support functionality.

It is to be appreciated that the above-described features of system 100 and other features of other illustrative embodiments are presented by way of example only, and should not be construed as limiting in any way. Accordingly, different numbers, types and arrangements of example system components such as host devices 102, network 104, storage arrays 105, storage devices 106, sets of IO queues 110, MPIO drivers 112 and instances of path selection logic 114, and additional or alternative components, can be used in other embodiments.

It should therefore be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of data copy offload logic implemented in the host devices 102 can be used to perform at least portions of the multi-protocol data copy offload command support functionality.

The operation of the information processing system 100 will now be described in further detail with reference to the flow diagram of the illustrative embodiment of FIG. 2. The process as shown includes steps 200 through 212, and is suitable for use in the system 100 but is more generally applicable to other types of systems comprising one or more host devices and at least one storage system. The one or more host devices are illustratively the first and second host devices 102-1 and 102-2 of FIG. 1, and the storage system illustratively comprises one or both of the storage arrays 105, with each such storage array comprising a plurality of storage devices. The storage devices of each such storage array are assumed to include logical storage devices such as LUNs or other logical storage volumes.

Figure 2:
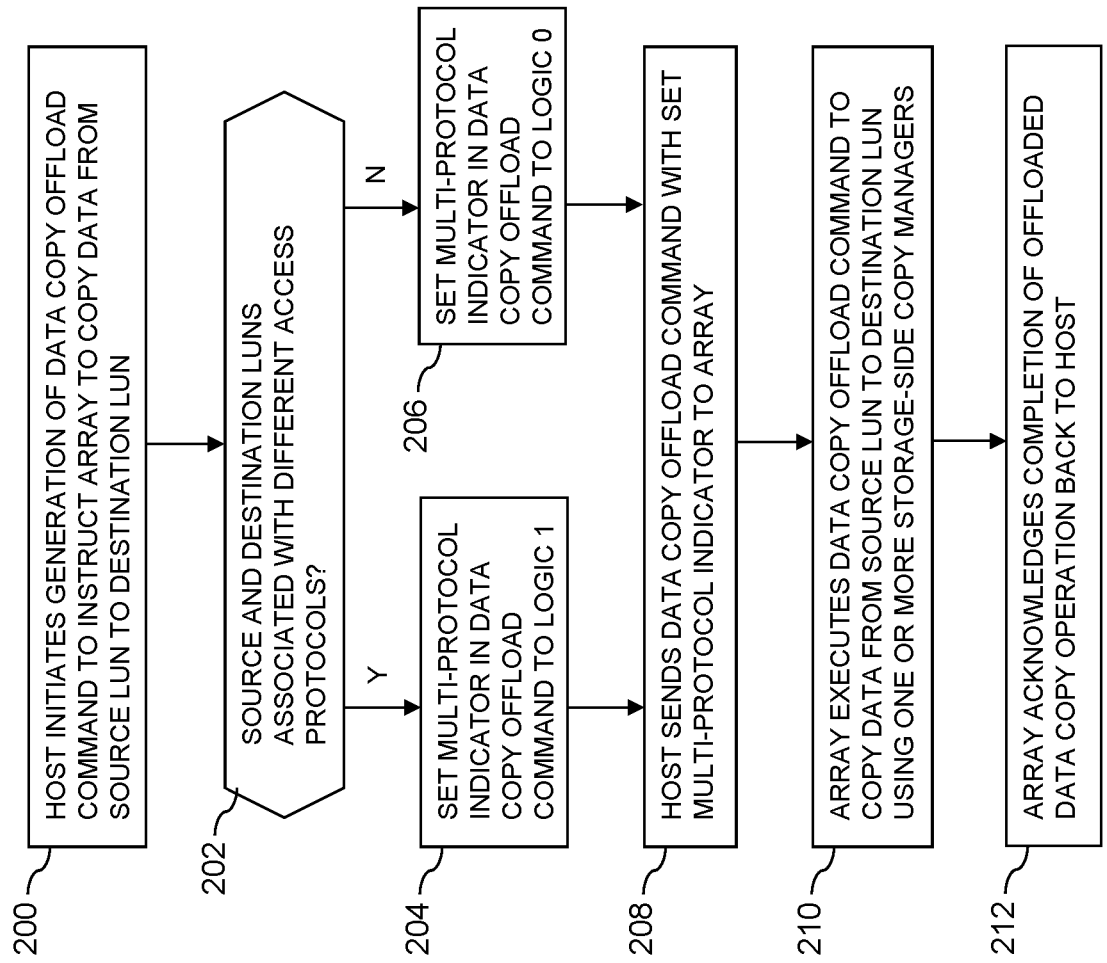
FIG. 2 is a flow diagram of a process for multi-protocol data copy offload command support utilizing a multi-path layer of a host device in an illustrative embodiment.

One or more steps of the FIG. 2 process are illustratively performed at least in part by or under the control of an MPIO layer comprising one or more MPIO drivers of respective host devices, such as the MPIO drivers 112-1 and 112-2 of the first and second host devices 102-1 and 102-2 of system 100, although other arrangements of system components, such as data copy offload logic instances of respective host devices and one or more copy managers of each of one or more storage arrays, additionally or alternatively perform at least portions of one or more of the steps. At least portions of the functionality of the FIG. 2 process may be performed at least in part in conjunction with a load balancing algorithm or other type of path selection algorithm executed by instances of path selection logic 114 of one or more MPIO drivers 112. A given host device is referred to as simply a "host" in the FIG. 2 process and elsewhere herein, and a storage array is simply referred to as an "array."

In step 200, a host initiates generation of a data copy offload command to instruct an array to copy data from a source LUN to a destination LUN. It is assumed for the present embodiment that the source and destination LUNs are on the same array, although other arrangements are possible. The source and destination LUNs are examples of what are more generally referred to herein as "source and destination logical storage devices."

In step 202, the host determines if the source and destination LUNs are associated with different access protocols, such as respective SCSI and NVMe access protocols. Responsive to an affirmative determination, the process moves to step 204, and responsive to a negative determination, the process moves to step 206.

Although the determination of step 202 is shown as being performed subsequent to initiation of the generation of the data copy offload command in step 200, this is by way of example only, and in other embodiments this determination can be made as part of the initiation in step 200, or prior to the initiation in step 200. It is therefore to be appreciate that the particular ordering of these and other steps of the process of FIG. 2 is presented by way of illustrative example only, and can be varied in other embodiments.

The SCSI and NVMe protocols utilized in the present embodiment are examples of what are more generally referred to herein as "first and second access protocols." The SCSI and NVMe protocols may more particularly comprise SCSI-FC and NVMeF access protocols, respectively, although numerous other types of first and second access protocols can be used in other embodiments.

In step 204, the host sets a multi-protocol indicator in the data copy offload command to a first value, illustratively a logic "1" value, which indicates to the array that the data copy offload command involves source and destination LUNs that utilize different access protocols.

In step 206, the host sets the multi-protocol indicator in the data copy offload command to a second value, illustratively a logic "0" value, which indicates to the array that the data copy offload command involves source and destination LUNs that utilize the same access protocol.

The particular single-bit multi-protocol indicator utilized in steps 204 and 206 is only one example of a multi-protocol indicator as that term is broadly used herein. Numerous other types of indicators and indicator formats may be used. Also, such an indicator in some embodiments may convey additional information, such as identifiers of the particular access protocol or access protocols utilized by the source and destination LUNs.

In step 208, the host sends the data copy offload command, with its multi-protocol indicator set to either logic "1" in step 204 or logic "0" in step 206, to the array. For example, the command may be sent by an MPIO driver of the host device over a particular path selected by the MPIO driver. Such a selected path may be, for example, a path over which the source LUN is accessed using a particular access protocol.

As noted above, the access protocol used to access the source LUN may be different than the access protocol used to access the destination LUN. In such a case, the data copy offload command may be more particularly referred to herein as a "multi-protocol data copy offload command."

In step 210, the array executes the data copy offload command to copy data from the source LUN to the destination LUN using one or more storage-side copy managers. For example, the one or more storage-side copy managers illustratively perform one or more copy functions based at least in part on the multi-protocol indicator, CSCD descriptors, segment descriptors and possibly other information in the data copy offload command. An example of a data copy offload command that includes a multi-protocol indicator, CSCD descriptors, segment descriptors and possibly other information will be described in more detail below in conjunction with the illustrative embodiment of FIG. 4.

In step 212, the array acknowledges completion of the offloaded data copy operation back to the host.

The steps of the FIG. 2 process are shown in sequential order for clarity and simplicity of illustration only, and certain steps can at least partially overlap with other steps. Also, one or more of the steps referred to as being performed by a particular system component, such as an MPIO layer comprising one or more MPIO drivers, can in other embodiments be performed at least in part by one or more other system components, such as data copy offload logic instances of a host device or one or more storage-side copy managers of a storage array.

As indicated above, different instances of the FIG. 2 process can execute at least in part in parallel with one another for different copy operations involving different logical storage devices. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and multi-protocol data copy offload command support functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different multi-protocol data copy offload command support arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
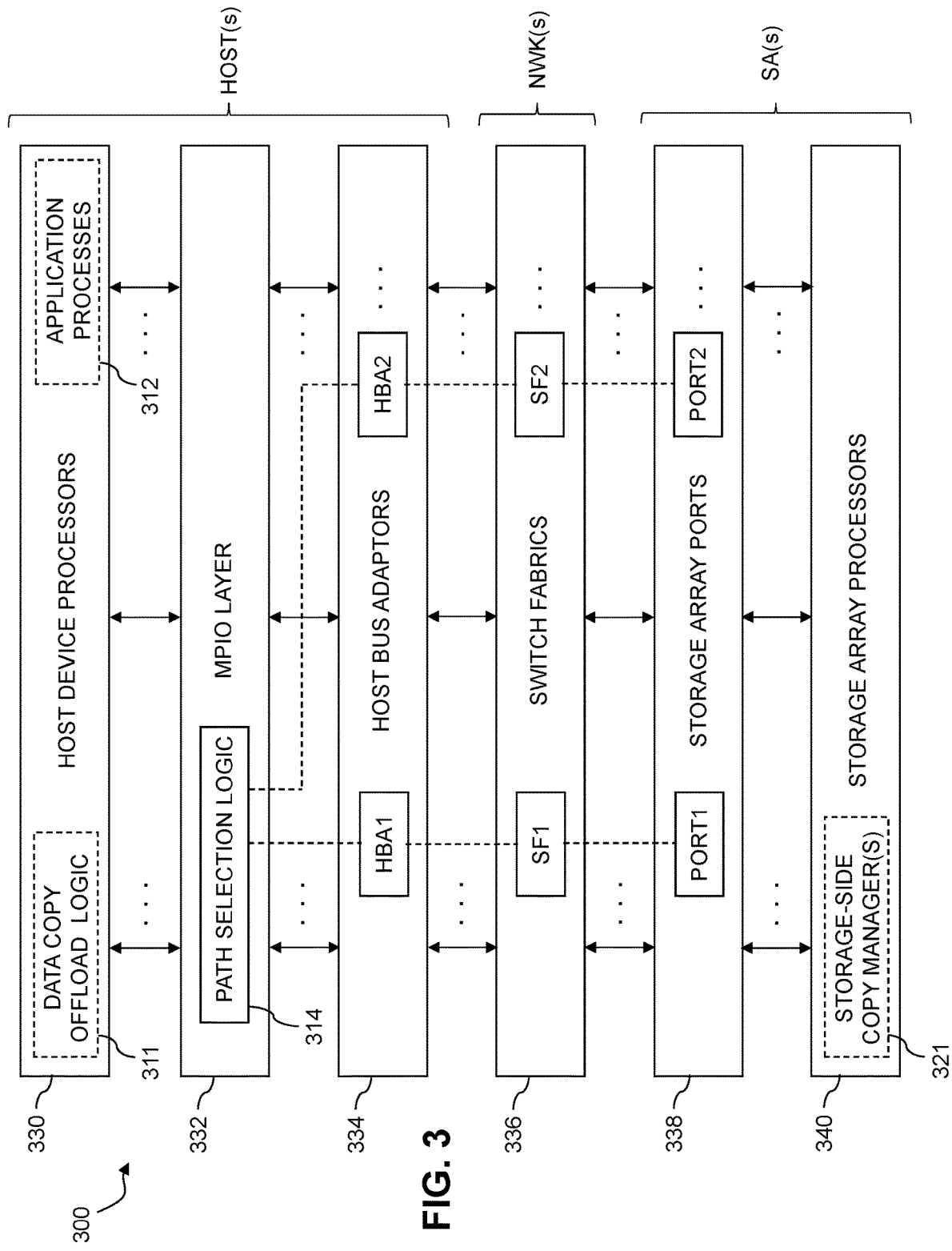
FIG. 3 is a block diagram showing multiple layers of a layered system architecture that includes a multi-path layer with multi-protocol data copy offload command support functionality in an illustrative embodiment.

Referring now to FIG. 3, another illustrative embodiment is shown. In this embodiment, an information processing system 300 comprises host-side data copy offload logic 311, application processes 312, path selection logic 314 and one or more storage-side copy managers 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements multi-protocol data copy offload command support for offloading from one of the host devices to one of the storage arrays data copy operations involving logical storage volumes or other logical storage devices of one or more storage arrays. The logical storage devices store data for one or more application processes running in one or more host device processors of the host device processor layer 330. The multi-protocol data copy offload command support functionality in this embodiment is assumed to be controlled at least in part by host-side data copy offload logic 311, path selection logic 314 of the MPIO layer 332, and one or more storage-side copy managers 321, although other arrangements are possible.

Figure 4:
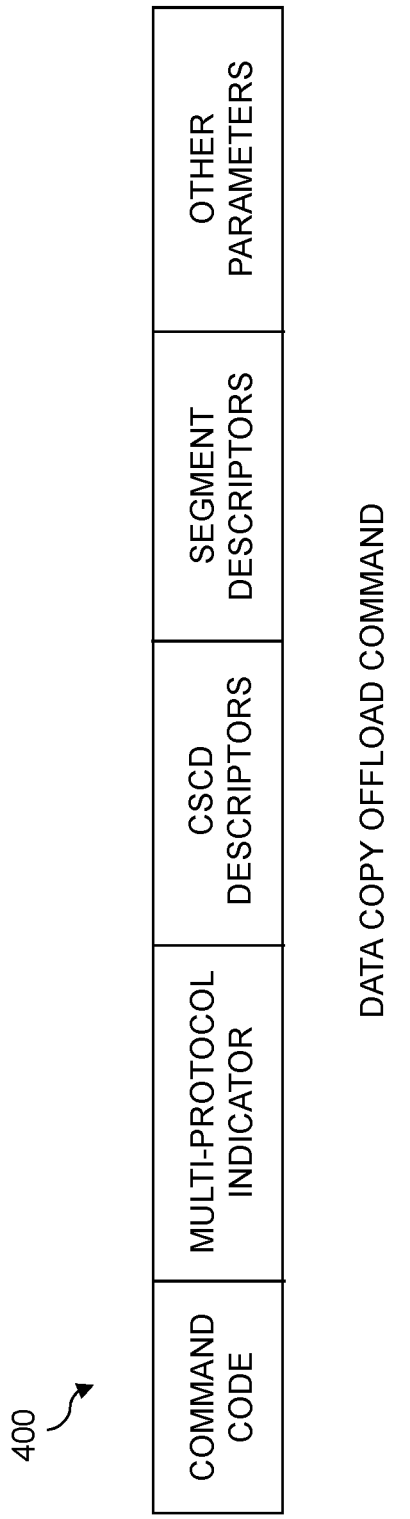
FIG. 4 shows an example of a multi-protocol data copy offload command generated by a host device in an illustrative embodiment.

The host-side data copy offload logic 311 implemented in the host device processor layer 330 controls generation of multi-protocol data copy offload commands in the system 300, in a manner similar to that described elsewhere herein. The host-side data copy offload logic 311 can include multiple distinct data copy offload logic instances for respective ones of a plurality of host devices of the system 300. An example of a data copy offload command generated in a host device of the system 300 is shown in FIG. 4.

The application processes 312 illustratively include processes of one or more backup applications or other data copy applications that are used to control generation of backup copies or other types of copies of logical storage volumes in the system 300. Such applications can interface with the data copy offload logic 311 in generating data copy offload commands.

The one or more storage-side copy managers 321 implemented in the storage array processor layer 340 control performance of offloaded data copy operations of the system 300, also in a manner similar to that described elsewhere herein. The one or more storage-side copy managers 321 can each include multiple distinct copy management logic instances for respective ones of a plurality of storage arrays of the system 300.

The host-side data copy offload logic 311 and one or more storage-side copy managers 321 are illustratively configured to implement at least portions of the functionality for multi-protocol data copy offload command support as disclosed herein. These components are shown in dashed outline in the figure, as they can be implemented in different locations within the system 300, or in a distributed manner across multiple locations. For example, the host-side data copy offload logic 311, although illustratively shown as part of the host device processor layer 330, can in other embodiments be implemented at least in part in the MPIO layer 332. As another example, the one or more storage-side copy managers 321, although illustratively shown as part of the storage array processor layer 340, can in other embodiments be implemented at least in part in the storage array port layer 338.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of IO operations to the storage arrays of system 300 as previously described. The path selection logic 314 in some embodiments operates in conjunction with the host-side data copy offload logic 311 and the one or more storage-side copy managers 321 in implementing at least portions of the functionality for multi-protocol data copy offload command support as disclosed herein. Additional or alternative layers and path selection logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

As indicated previously, the host devices and storage arrays of system 300 through their respective instances of host-side data copy offload logic 311 and one or more storage-side copy managers 321 provide functionality for data copy offload across multiple access protocols as described elsewhere herein, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that a given host device interacts with a given storage array to provide the disclosed functionality for multi-protocol data copy offload command support, possibly with involvement of one or more other system components.

FIG. 4 shows an example of a multi-protocol data copy offload command 400 generated by a host device in an illustrative embodiment. The multi-protocol data copy offload command 400 in this embodiment illustratively comprises a command code that identifies the particular command type as a data copy offload command, and a multi-protocol indicator. The multi-protocol indicator takes on a first value to specify that the data copy offload command is a multi-protocol data copy offload command and takes on a second value to specify that the data copy offload command is not a multi-protocol data copy offload command, but is instead a single-protocol data copy offload command. For example, the multi-protocol indicator can comprise a single bit having a first binary logic value, such as a logic "1" value, to indicate that the data copy offload command is a multi-protocol data copy offload command, and a second binary logic value, such as a logic "0" value, to indicate that the data copy offload command is a single-protocol data copy offload command.

Other types of multi-protocol indicators can be used in other embodiments. For example, in some embodiments, the multi-protocol indicator can identify the particular storage access protocols that are associated with source and destination logical storage devices. It is assumed for this embodiment that the multi-protocol indicator has a particular value that specifies that the command as illustrated in the figure is in fact a multi-protocol data copy offload command.

Also included in the multi-protocol data copy offload command 400 are CSCD descriptors, segment descriptors, and possibly one or more other parameters, or other related information. The CSCD descriptors identify the source and destination logical storage devices of the data copy operation, and the segment descriptors identify particular data to be copied, for use by a copy function of the storage-side copy manager to copy that data from the source logical storage device to the destination logical storage device. Additional or alternative fields arranged in a wide variety of different ways can be used to implement a multi-protocol data copy offload command as disclosed herein.

In the context of the FIG. 1 embodiment, the multi-protocol data copy offload command 400 is assumed to be generated by one of the host devices 102, possibly at least in part utilizing its corresponding one of the MPIO drivers 112, and sent by that MPIO driver over a selected one of a plurality of paths to one of the storage arrays 105.

In the context of the FIG. 3 embodiment, the multi-protocol data copy offload command 400 is assumed to be generated by one of the host device processors of the host device processor layer 330, possibly with some involvement of a corresponding MPIO driver of the MPIO layer 332, and sent by that sent by that MPIO driver over a selected one of a plurality of paths to one of the storage arrays associated with layers 338 and 340.

Another additional embodiment implements a process that is illustratively performed by a given host device interacting with a given storage array, possibly with involvement of other system components. Such an embodiment can be configured, for example, to generate multi-protocol data copy offload commands of the type disclosed herein.

The process in the present example more particularly comprises an algorithm performed by at least one host device interacting with at least one storage array, with the one or more host devices illustratively utilizing their respective MPIO drivers to perform at least portions of the algorithm.

It is assumed that a multi-protocol data copy offload command in this embodiment is implemented through modification of an existing SCSI XCOPY command, or using a vendor unique or VU command of one of the multiple storage access protocols, such as a VU SCSI command.

It is further assumes that the multi-protocol data copy offload command includes a set of descriptors that instruct a storage-side copy manager to perform a data copy operation between source and destination logical storage devices associated with respective different storage access protocols, such as respective SCSI and NVMe access protocols. The descriptors illustratively include CSCD descriptors that identify the source and destination logical storage devices as well as one or more segment descriptors that are used by a copy function of the storage-side copy manager to move corresponding data from the source logical storage device to the destination logical storage device. The command can include other parameters, such as those commonly associated with a conventional SCSI XCOPY command, as well as other types of information facilitating data copy offload across multiple access protocols.

The algorithm illustratively includes the following steps, although additional or alternative steps could be used:

1. A host uses an inquiry command to obtain information from the storage array indicating whether or not the storage array supports multi-protocol data copy offload commands. For example, an otherwise conventional inquiry command in the first access protocol can be modified to return a bit or other information indicating whether or not the storage array supports multi-protocol data copy offload commands. Assume by way of example that the information returned in response to the inquiry command indicates that the storage array does support multi-protocol data copy offload commands.

2. The host determines that data of source logical storage device accessible using a first storage access protocol is to be copied to a destination logical storage device accessible using a second storage access protocol different than the first storage access protocol. Assume by way of example that the first storage access protocol is a SCSI access protocol and the second storage access protocol is an NVMe access protocol. A need for such data copying may arise as part of a migration or replication operation, or in other contexts.

3. The host generates a multi-protocol data copy offload command that includes CSCD descriptors that identify the source and destination logical storage devices as well as one or more segment descriptors that identify particular data to be copied. The multi-protocol data copy offload command further comprises a multi-protocol indicator, illustratively in the form of a single additional bit, that is set to indicate to the storage-side copy manager that the data copy offload command is more particularly a multi-protocol data copy offload command involving copying from a source logical storage device of the first storage access protocol to a destination logical storage device of the second storage access protocol. The command is illustratively generated by data copy offload logic of host software.

4. The MPIO driver of the host sends the multi-protocol data copy command to the storage array over a selected one of a plurality of paths to the source storage device using the first storage access protocol.

5. The storage array receives the multi-protocol data copy command in the first storage access protocol and uses the multi-protocol indicator of the command to recognize the command as instructing the storage array to perform a data copy operation offloaded from the host and involving multiple distinct access protocols.

6. A copy manager of the storage array validates the source and destination logical storage devices from the CSCD descriptors. It is assumed in this embodiment that a single copy manager of the storage array can be configured to handle copy operations involving logical storage devices in both the first and second storage access protocols. In other embodiments, a first copy manager of the storage array is associated with the first storage access protocol and is assumed to be able to initiate requests to a second copy manager of the storage array, where the second copy manager is associated with the second storage access protocol.

7. The copy manager performs copy functions specified by the segment descriptors of the multi-protocol data copy offload command. This illustratively involves an application client of the copy manager sending one or more commands to local device servers and possibly also remote device servers associated with the source and destination logical storage devices. The specific commands sent by the copy manager while processing the segment descriptors are illustratively protocol and vendor specific. After all of the copy functions specified by the segment descriptors are completed, the offloaded data copy is complete and an appropriate notification is sent by the storage array back to the host.

The host device portions of the above algorithm may be similarly performed by one or more other host devices, and the storage array portions of the above algorithm may be similarly performed by one or more other storage arrays.

Also, ESXi, Linux and other host environments are used herein as non-limiting examples only, and the same or similar multi-protocol data copy offload command support techniques can be used in a wide variety of other host device environments.

Again, the above algorithm is presented by way of illustrative example only, and other embodiments can utilize additional or alternative steps. Also certain steps illustrated as being performed serially can instead be performed at least in part in parallel with one another.

Accordingly, these and other particular multi-protocol data copy offload command support arrangements described herein are presented by way of illustrative example only. Numerous alternative arrangements can be used in implementing multi-protocol data copy offload command support in other embodiments.

It is apparent from the foregoing that the illustrative embodiments disclosed herein can provide a number of significant advantages relative to conventional arrangements.

For example, illustrative embodiments disclosed herein therefore overcome drawbacks of conventional approaches, by providing data copy offload command support across multiple storage access protocols for logical storage devices of a storage array or other type of storage system.

These and other embodiments illustratively allow a data copy offload command to be executed by a storage system to copy a source logical storage device to a destination logical storage device even when the source and destination logical storage devices utilize different storage access protocols, such as respective SCSI and NVMe access protocols, or more particularly SCSI-FC and NVMeF access protocols.

Such arrangements advantageously facilitate copying of logical storage devices across multiple access protocols and therefore provide improved overall system performance.

Conventional techniques fail to provide multi-protocol support for data copy offload commands and as a result host software has to consume host CPU cycles, RDMA buffers, HBA queues and other resources to perform host-side data copying across logical storage devices of distinct protocols. These and other drawbacks of conventional practice are overcome in illustrative embodiments.

The disclosed functionality can be implemented using a wide variety of different host devices and storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, data copy offload logic, copy processes and additional or alternative components. Also, the particular configurations of system and device elements and associated processing operations illustratively shown in the drawings can be varied in other embodiments. For example, a wide variety of different host device and storage system configurations and associated multi-protocol data copy offload command support arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
said at least one processing device being configured:
to generate a data copy offload command to offload a data copy operation from a host device to a storage system, the command comprising a multi-protocol indicator that specifies that data is to be copied from a source logical storage device that utilizes a first access protocol to a destination logical storage device that utilizes a second access protocol different than the first access protocol; and
to send the data copy offload command from the host device to the storage system over a network for performance of the offloaded data copy operation in the storage system in accordance with the command;
wherein the data copy offload command comprises, in addition to the multi-protocol indicator, source and destination descriptors identifying the respective source and destination logical storage devices and one or more additional descriptors identifying particular data to be copied from the source logical storage device to the destination logical storage device in accordance with the data copy offload command.

2. The apparatus of claim 1 wherein the first access protocol comprises a Small Computer System Interface (SCSI) access protocol and the second access protocol comprises a Non-Volatile Memory Express (NVMe) access protocol.

3. The apparatus of claim 2 wherein the SCSI access protocol comprises a SCSI over Fibre Channel (SCSI-FC) access protocol and the NVMe access protocol comprises an NVMe over Fabrics (NVMeF) access protocol.

4. The apparatus of claim 1 wherein said at least one processing device comprises at least a portion of the host device.

5. The apparatus of claim 1 wherein the command is sent over a selected path to the source logical storage device utilizing the first access protocol, the path being associated with a particular initiator-target pair, the initiator of the initiator-target pair comprising a corresponding host bus adaptor of the host device and the target of the initiator-target pair comprising a corresponding port of the storage system.

6. The apparatus of claim 1 wherein the host device comprises a multi-path layer, the multi-path layer comprising at least one multi-path input-output driver configured to control delivery of input-output operations from the host device to the storage system over selected paths through the network.

7. The apparatus of claim 1 wherein the data copy offload command comprises an extended copy command that includes, copy-source and copy-destination descriptors as respective ones of the source and destination descriptors and one or more segment descriptors as respective ones of the one or more additional descriptors.

8. The apparatus of claim 1 wherein the data copy offload command comprises a modified version of an extended copy command in one of the first and second access protocols.

9. The apparatus of claim 1 wherein the data copy offload command comprises a vendor unique command in one of the first and second access protocols.

10. The apparatus of claim 1 wherein said at least one processing device is further configured to generate an inquiry command and to send the inquiry command to the storage system in order to determine whether or not the storage system supports multi-protocol data copy offload commands.

11. The apparatus of claim 1 wherein the multi-protocol indicator of the data copy offload command takes on a first value to specify that the data copy offload command is a multi-protocol data copy offload command and takes on a second value different than the first value to specify that the data copy offload command is a single-protocol data copy offload command.

12. The apparatus of claim 11 wherein the multi-protocol indicator comprises a single bit.

13. The apparatus of claim 1 wherein the storage system is configured to perform one or more copy functions specified by one or more segment descriptors of the data copy offload command.

14. The apparatus of claim 13 wherein the copy functions are performed by cooperative interaction of a first copy manager associated with the first access protocol and a second copy manager associated with the second access protocol.

15. A computer program product comprising a non-transitory processor-readable storage medium having stored therein program code of one or more software programs, wherein the program code, when executed by at least one processing device comprising a processor coupled to a memory and configured to communicate over a network with a storage system, causes said at least one processing device:
to generate a data copy offload command to offload a data copy operation from a host device to a storage system, the command comprising a multi-protocol indicator that specifies that data is to be copied from a source logical storage device that utilizes a first access protocol to a destination logical storage device that utilizes a second access protocol different than the first access protocol; and
to send the data copy offload command from the host device to the storage system over a network for performance of the offloaded data copy operation in the storage system in accordance with the command;
wherein the data copy offload command comprises, in addition to the multi-protocol indicator, source and destination descriptors identifying the respective source and destination logical storage devices and one or more additional descriptors identifying particular data to be copied from the source logical storage device to the destination logical storage device in accordance with the data copy offload command.

16. The computer program product of claim 15 wherein the data copy offload command comprises an extended copy command that includes copy-source and copy-destination descriptors as respective ones of the source and destination descriptors and one or more segment descriptors as respective ones of the one or more additional descriptors.

17. The computer program product of claim 15 wherein the multi-protocol indicator of the data copy offload command takes on a first value to specify that the data copy offload command is a multi-protocol data copy offload command and takes on a second value different than the first value to specify that the data copy offload command is a single-protocol data copy offload command.

18. A method comprising:

generating a data copy offload command to offload a data copy operation from a host device to a storage system, the command comprising a multi-protocol indicator that specifies that data is to be copied from a source logical storage device that utilizes a first access protocol to a destination logical storage device that utilizes a second access protocol different than the first access protocol; and sending the data copy offload command from the host device to the storage system over a network for performance of the offloaded data copy operation in the storage system in accordance with the command;

wherein the data copy offload command comprises, in addition to the multi-protocol indicator, source and destination descriptors identifying the respective source and destination logical storage devices and one or more additional descriptors identifying particular data to be copied from the source logical storage device to the destination logical storage device in accordance with the data copy offload command; and wherein the method is performed by at least one processing device comprising a processor coupled to a memory.

19. The method of claim 18 wherein the data copy offload command comprises an extended copy command that includes copy-source and copy-destination descriptors as respective ones of the source and destination descriptors and one or more segment descriptors as respective ones of the one or more additional descriptors.

20. The method of claim 18 wherein the multi-protocol indicator of the data copy offload command takes on a first value to specify that the data copy offload command is a multi-protocol data copy offload command and takes on a second value different than the first value to specify that the data copy offload command is a single-protocol data copy offload command.

\* \* \* \* \*